United States Patent [19]

Ogawa et al.

[11] Patent Number: 4,803,399
[45] Date of Patent: Feb. 7, 1989

[54] FLUORESCENT LAMP ARRANGEMENT FOR UNIFORMLY ILLUMINATING A DISPLAY PANEL

[75] Inventors: Soichiro Ogawa, Tokyo; Toshihiko Sano, Ome, both of Japan

[73] Assignee: Hitachi, Ltd., Tokyo, Japan

[21] Appl. No.: 198,600

[22] Filed: May 23, 1988

Related U.S. Application Data

[63] Continuation of Ser. No. 893,818, Aug. 6, 1986, abandoned.

[30] Foreign Application Priority Data

Aug. 14, 1985 [JP] Japan ................... 60-177517

[51] Int. Cl.$^4$ .............. H01J 61/42; H01J 61/35; G02F 1/13
[52] U.S. Cl. .................... 313/493; 313/117; 313/635; 350/345
[58] Field of Search .............. 313/117, 485, 493, 635; 350/345; 362/260

[56] References Cited

U.S. PATENT DOCUMENTS

| 2,260,473 | 10/1941 | Minchillo | 313/117 |
| 4,001,628 | 1/1977 | Ryan | 313/493 X |
| 4,206,501 | 6/1980 | Brooks | 350/345 X |
| 4,267,489 | 5/1981 | Morohashi | 315/324 |
| 4,335,421 | 6/1982 | Modia et al. | 362/260 X |
| 4,432,044 | 2/1984 | Lautzenheiser | 362/260 X |
| 4,502,761 | 3/1985 | Knoll et al. | 350/345 |

FOREIGN PATENT DOCUMENTS

| 47-294 | 7/1973 | Japan . |
| 15126 | 2/1980 | Japan . |
| 133008 | 10/1980 | Japan . |
| 226303 | 12/1984 | Japan . |

*Primary Examiner*—Palmer C. DeMeo
*Attorney, Agent, or Firm*—Antonelli, Terry & Wands

[57] ABSTRACT

Disclosed is a fluorescent lamp arrangement for uniformly illuminating a display panel wherein a fluorescent lamp having a glass tube is provided with electrodes at opposite sides thereof, a fluorescent layer is formed over an inner surface of the glass tube, and mercury and a rare gas are sealed in the glass tube; and a light-shading patterned layer is formed along a surface of the glass tube so as to make luminance on a display panel substantially uniform when the fluorescent lamp and the display panel are parallelly disposed to a plane which includes a longitudinal axis of the glass tube.

26 Claims, 2 Drawing Sheets

FLUORESCENT LAMP ARRANGEMENT FOR UNIFORMLY ILLUMINATING A DISPLAY PANEL

This application is a continuation of application Ser. No. 893,818, filed on Aug. 6, 1986, now abandoned.

BACKGROUND OF THE INVENTION

The present invention generally relates to an improvement in a fluorescent lamp arrangement used as a back-light for a liquid crystal display (L.C.D.) panel, or the like, and particularly to a construction of a fluorescent lamp arrangement used as a back-light which can evenly and uniformly illuminate a liquid crystal display surface.

A conventional liquid crystal display has been arranged such that, as disclosed in Japanese Patent Unexamined Publication JP-A-48-47294 (1973), an elongated fluorescent lamp is provided at the back of a liquid crystal display panel and a reflector is attached behind the lamp. In this case, however, no consideration is given to the problem of uneveness of luminance on the surface of the liquid crystal display panel, so that luminance becomes extremely large at its portion just above the lmap and it cannot achieve uniformity of luminance over the whole surface. As disclosed in Japanese Patent Unexamined Publications JP-A-55-15126 (1980) and JP-A-55-133008 (1980), in order to decrease the quantity of light at a portion just above the light source, an arrangement has been proposed in which a transparent film having a reflecting material printed thereon is disposed horizontally between a diffusion board and the light source. In this arrangement, there is an effect of a decrease in unevenness in distribution of luminance when viewed in a direction perpendicular to the diffusion board. However, in the case where such transparent film is utilized in a liquid crystal display, or the like, it is difficult to satisfy the requirement such that the transparent film having the reflecting material would be effective to make the luminance uniform in any direction within a range of ±45 angular degrees with respect to the vertical direction, because the light source is viewed directly through the diffusion board when viewed obliquely beyond a certain angle smaller than 45 angular degrees with respect to the vertical direction, resulting in undesired visual angular characteristic.

There is another proposal in which, as disclosed in Japanese Patent Unexamined Publication JP-A-59-226303 (1984), a light source such as a light emitting diode (LED), an incandescent lamp, a tungsten halogen lamp or a fluorescent lamp is used in combination with a light diffusion plate made of transparent acryl material so as to obtain an area source of light illuminating above the transparent acryl plate. In this arrangement, however, the luminance is so small to be at most several hundreds nt ($Cd/m^2$) which is insufficient to satisfy the requirements of obtaining luminance of 1000 nt or more for use in a liquid crystal TV receiver using color liquid crystal or the like and of reducing electric power consumption as much as possible.

SUMMARY OF THE INVENTION

It an object of the present invention is to provide an improved high luminance fluorescent lamp to be used as a back light, or the like, in a liquid crystal display panel, in which light radiated outwardly from the lamp surface which is located opposite to liquid crystal display panel is made uniform. When a fluorescent lamp is disposed behind a liquid crystal display panel to illuminate the liquid crystal display panel in cooperation with a reflector, the lamp per se is superior in efficiency insofar as providing a high luminance, however, the luminance becomes higher at only the portion directly above the fluorescent lamp than other portions, resulting in unevenness in luminance. According to the present invention, therefore, the quantity of light emitted from a fluorescent lamp is adjusted in advance by means of a patterned layer for shading light so as to eliminate unevenness in luminance on the surface of the liquid crystal display panel, thereby obtaining a fluorescent lamp used as a back light which is high in luminance and good in efficiency.

DESCRIPTION OF THE PREFERRED EMBODIMENTS

Figure 1:
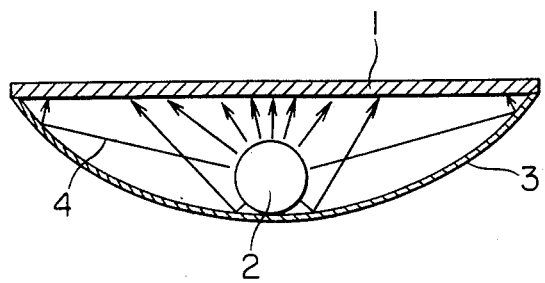
FIG. 1 is a schematic view showing an example of the conventional arrangement of back light.
Figure 2:
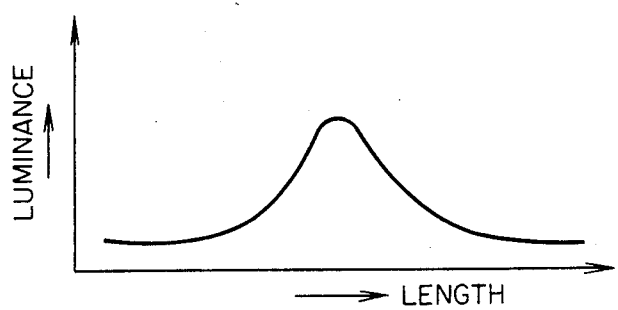
FIG. 2 is a graph showing distribution of luminance of the conventional back light.

FIG. 1 shows an example of the conventional system, as disclosed in the above-mentioned JP-A-48-47294 (1973), for the purpose of comparison with the present invention, in which a fluorescent lamp 2 and an aluminum reflector 3 having a curved surface are disposed at the back of a liquid crystal display panel 1. In the arrangement of FIG. 1, the distribution of luminance is as shown in FIG. 2 and the unevenness of luminance becomes ±60% so that the arrangement can not be utilized practically.

The fluorescent lamp 2 is an ordinary one provided with electrodes at its opposite sides and a glass tube having a fluorescent layer formed over an inner surface thereof and having mercury and rare gas sealed therein.

Figure 3:
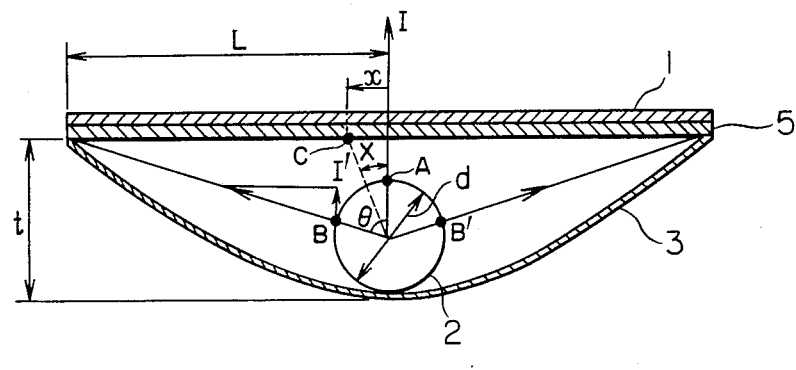
FIG. 3 is a schematic view of the back light in section for explaining the principle of the present invention.

To eliminate the above-mentioned disadvantage in the prior art, according to the present invention, as shown in FIG. 3, a patterned layer for shading light (a pattern made of a material which has a property of reflecting or absorbing light) is formed through printing on the surface of a fluorescent lamp 2 so that the luminance on a lamp 2 along a range B—B' is made to be uniform and equal to a cosine value I' of the lamp luminance I on each of the crossing points B and B' where the outer peripheral surface of a glass tube of the fluroescent lamp 2 intersects with the lines connecting the center of the glass tube to the respective opposite ends of a diffusion board 5 provided on the rear of a liquid crystal display panel 1. Thus, means for eliminating unevenness in luminance is provided on the fluorescent lamp 2 per se. The liquid crystal display panel 1 and the diffusion board 5 are provided in parallel to a plane which contains the longitudinal axis of the tube of the fluorescent lamp 2. The result of measurement of the distribution of luminance on the liquid crystal display panel 1 provied that uneveness in luminance could be suppressed to be within ±20%. In this case, the diffusion board 5 acts to disperse and radiate the light from the lamp 2 so that the visual angle characteristic can be made much better than the case employing no diffusion board. As a material of the diffusion board 5, an acryl board of milk-white (thickness t=2.00 mm) was used.

Figure 4:
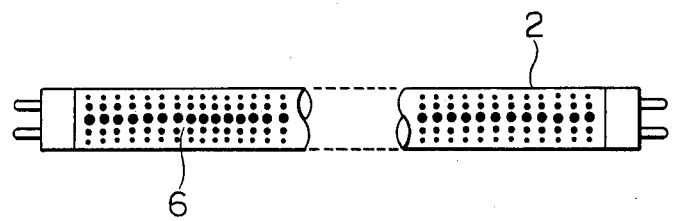
FIG. 4 is a schematic view of a fluorescent lamp according to the present invention.
Figure 5:
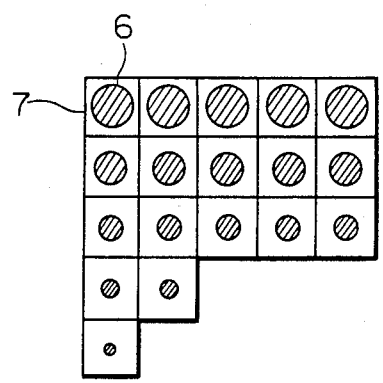
FIG. 5 is a view showing an example of the pattern printed portion.

Next, description will be given as to the pattern to be printed on the lamp 2 with a material, for example, ink containing fine particles of $TiO_2$, Al or the like, having a property of absorbing or reflecting light. As shown in FIGS. 4 and 5, circles 6 of the pattern are printed with the above-mentioned material such that those circles 6 of the pattern located substantially along the longitudinal line on the surface of the glass tube of the lamp 2 extending parallely to the center line of the glass tube and passing a point A thereon, as shown in FIG. 3, closest to the surface of the diffusion board 5 have the largest areas and the areas of the circles are reduced gradually as the circles become more distint from the line A, on the surfaces of the glass tube as seen in FIG. 4. The shape of each pattern is not limited to a circle but may be a triangle, a square, a hexagon, or the like. FIG. 5 is a partially enlarged view of the light-shading patterns of FIG. 4. In FIG. 3, in order to set the luminance at any point on the tube surface portion within the range between the crossing points B and B' to be equal to the abovementioned luminance value I', the area Y of each circle 6 may be expressed, as a function of X which is a circumferential distance between the center of a given round and the point A, by the following equation (1):

$$Y = 1 - \sqrt{\frac{\left(t - \frac{d}{2}\right)^2 \tan^2 \frac{2X}{d} + \left(t - \frac{d}{2}\right)^2}{L^2 + \left(t - \frac{d}{2}\right)^2}} \quad (1)$$

where t represents the maximum depth of the light guide portion or the reflector 3, d represents the diameter of the lamp 2 at its glass tube, and L represents the distance from the widthwise center of the crystal liquid display panel 1 to each of the opposite ends of the same. X may be represented by the following equation:

$$X = \frac{d}{2} \tan^{-1} \frac{x}{t - \frac{d}{2}}$$

where x represents the widthwise distance on the surface of the crystal liquid display panel 1 from its widthwise center to a point c where the line connecting the tube center to the center of the given circle of the patterned layer intersects the diffusion board 5. In this case, as seen in FIG. 5, the surface of the glass tube of the lamp 1 is divided into unit squares 7 and the circles 6 are correspondingly and respectively disposed in the squares 7. In the equation (1), the respective square 7 has a unit area or an area of 1 (one). Alternatively, the patterns may be arranged such that the patterns on the second row are shifted by ½ pitch relative to the patterns on the first row, the patterns on the third row are shifted by ½ pitch relative to the patterns on the second row, and so on.

According to the foregoing equation (1), the circles 6 were printed with high density as much as possible. The color of the ink used for printing was silver. Alternatively, white ink can provide the same effect as the silver one.

The lamp 2 on which the foregoing printing had been performed was assembled as shown in FIG. 3, with the dimensions t=25 mm, d=15.5 mm, L=50 mm, the area of the respective largest circle 6 being 0.785 $mm^2$ (diameter $\phi$=1.0 mm), the pitch x of the opaque circles 6 being 1 mm (length of each side of the square 7). With this example, when the fluorescent lamp 2 was lighted with 2 watts, means luminance of 1000 nt could be obtained with unevenness in luminance within ±10% on the surface of the diffusion board 5 (100 mm×130 mm). Further, it has been provied that the unevenness in luminance can be further reduced in the case where the following correction equation (2) is used:

$$Y = \left(1 - \sqrt{\frac{\left(t - \frac{d}{2}\right)^2 \tan^2 \frac{2X}{d} + \left(t - \frac{d}{2}\right)^2}{L^2 + \left(t - \frac{d}{2}\right)^2}}\right) \times a \quad (2)$$

where a represents a coefficient of correction which is selected to be a value within a range from 0.6 to 0.9.

In the case where the similar experiment was carried out by using the conventional lamp system with the same dimensions as the foregoing example as the embodiment of the present invention, the mean luminance was 900 nt and the unevenness in luminance was ±60%. Thus, the result shows that the conventional lamp system can not be used practically.

The shape of the reflector 3 is not limited to a specific configuration. Although the reflector 3 is formed to have a concave reflecting surface in the embodiment shown in FIG. 3, it may be modified to have a substantially rectangular parallelepiped lunch-box-like shape. The reflector 3 is effective in increasing the whole luminance on the diffusion board 5.

As the material of the reflector 3, an aluminum plate having a brilliant surface was used, however, the same effect can be obtained by using a plate of resin such as polybutylene terephthalate (PBT) or the like.

It is needless to say that the same effect can be obtained when a tracing sheet of polyethylene terephthalate resin (PET) or the like having patterns printed thereon in advance is struck on the lamp 2 in place of direct printing on the surface of the lamp 2.

Although the foregoing embodiment is arranged such that the luminance at any point on the surface of the lamp 2 in the direction perpendicular to the crystal display panel 1, that is, the cosine value of the luminance at any point on the lamp surface in the normal direction to the lamp, is made equal, the same effect can be obtained by any means so long as the means can make uniform the luminance of the lamp on the surface thereof in the direction perpendicular to the crystal display panel 1.

According to the present invention, the fluorescent lamp on which printing is simply performed is used as a back light for a liquid crystal panel or the like, with the various effects as follows:

(1) A back light having less unevenness in luminance can be provided;

(2) The lamp system is superior in view of visual angle characteristics, because printing is performed on the outer peripheral surface of the lamp;

(3) There is no problem of a difficulty of registration between a film sheet and the lamp which otherwise might be caused if such a film sheet is disposed above the lamp;

(4) It is easy in assembling of the lamp system with a reduced weight because the printing is provided on the outer periphery of the lamp; and (5) There is an advantage of reduction in weight, because only the lamp, the reflector, and the diffusion board are used in this lamp system, while the weight is increased in such an arrangement where a lamp is placed horizontally with an acrylic board as a light conduction body.

What is claimed is:

1. A fluorescent lamp arrangement for uniformly illuminating a display panel having two parallel side edges, comprising:
   a fluorescent lamp having a glass tube having a center axis and two opposite ends and provided with electrodes at said opposite ends, a fluorescent layer formed over an inner surface of said glass tube, and mercury and a rare gas sealed in said glass tube; and
   a light-shading patterned layer formed on a circumferential part of a surface of said glass tube so as to effect a substantially uniform luminance on said display panel when said fluorescent lamp is mounted in a predetermined positional relationship with the display panel such that said display panel is parallelly disposed to the center axis of said glass tube and illuminated through said light-shading patterned layer by said fluorescent lamp, said circumferential part facing the display panel when said fluorescent lamp is mounted and wherein said part is defined as that part of said surface between two lines on said surface defined by a radial intersection of imaginary planes therethrough, each plane including said center axis and a respective one of said side edges thereby effecting in substantially uniform distribution of luminance comfort at viewing angles other than perpendicular to the display panel.

2. A fluorescent lamp arrangement according to claim 1, in which said light-shading patterned layer is formed by applying a material having a property of absorbing or reflecting light from said fluorescent lamp directly onto an outer surface of said glass tube by printing.

3. A fluorescent lamp arrangement according to claim 1, in which said light-shading patterned layer is formed by sticking a transparent film on which a material having a property of absorbing or reflecting light from said fluorescent lamp is printed, onto an outer surface of said glass tube.

4. A fluorescent lamp arrangement according to claim 1, in which said light-shading patterned layer includes round patterns.

5. A fluorescent lamp arrangement according to claim 1, wherein said display panel comprises a liquid crystal display (LCD) panel.

6. A fluorescent lamp arrangement according to claim 1, further comprising a diffusion means parallelly disposed on the inner surface of said display panel for dispersing and radiating the light from said lamp so as to result in an increase in the visual angle.

7. A fluorescent lamp arrangement according to claim 1, wherein said light-shading patterned layer includes one of said opaque circles, opaque triangular areas, opaque square areas or opaque hexagonal areas.

8. A fluorescent lamp arrangement according to claim 1, further comprising a reflector with a reflecting surface facing the display panel and being disposed so as to reflect incident light from said fluorescent lamp to said display panel.

9. A fluorescent lamp arrangement for uniformly illuminating a display panel having two parallel side edges and which has an outer surface and an inner surface, comprising:
   a fluorescent lamp including a glass tube having a center axis and two opposite ends and provided with electrodes at said opposite ends, a fluorescent layer formed over an inner surface of said glass tube, and wherein said glass tube is sealed and having therein mercury and a rare gas; and
   a light-shading patterned layer disposed on a circumferential part of the outer surface of said glass tube, said patterned layer including a plurality of rows of predetermined pattern shapes along a length of the surface of said glass tube in a direction substantially along said center axis wherein rows of the pattern shapes located on the circumferential surface of said glass tube nearest the inner surface of the display panel having the largest dimensioned pattern shapes of said patterned layer so as to make luminance substantially uniform on said display panel when said fluorescent lam pis mounted in a predetermined positional relationship with the display panel wherein said display panel is parallelly disposed to the cetner axis of said glass tube and illuminated through said light-shading patterned layer by said fluorescent lamp, said circumferential part facing the display panel when said fluorescent lamp is mounted and wherein said part is defined as that part of said surface between two lines on said surface defined by a radial intersection of imaginary planes therethrough, each plane including said center axis and a respective one of said side edges.

10. A fluorescent lamp arrangement according to claim 9, wherein said plurality of parallel rows of predetermined pattern shapes being disposed on said glass surface such that the relative dimensional areas of the respective pattern shapes in successive rows and in a direction away from the location nearest the inner surface of the display panel proportionately decreasing.

11. A fluorescent lamp arrangement according to claim 10, in which said light-shading patterned layer is formed by applying a material having a property of absorbing or reflecting light from said fluorescent lamp directly onto an outer surface of said glass tube by printing.

12. A fluorescent lamp arrangement according to claim 10, in which said light-shading patterned layer is formed by sticking a transparent film, on which a material having a property of absorbing or reflecting light from said fluorescent lamp is printed, onto an outer surface of said glass tube.

13. A fluorescent lamp arrangement according to claim 10, in which said light-shading patterned layer includes round patterns.

14. A fluorescent lamp arrangement according to claim 10, wherein said display panel comprises a liquid crystal display (LCD) panel.

15. A fluorescent lamp arrangement according to claim 10, further comprising a diffusion means parallelly disposed on the inner surface of said display panel for dispersing and radiating the light from said lamp so as to result in an increase in the visual angle.

16. A fluorescent lamp arrangement according to claim 9, in which said light-shading patterned layer is formed by applying a material ahving a property of absorbing or reflecting light from said fluorescent lamp directly onto an outer surface of said glass tube by printing.

17. A fluorescent lamp arrangement according to claim 9, in which said light-shading patterned layer is formed by sticking a transparent film, on which a material having a property of absorbing or reflecting light from said fluorescent lamp is printed, onto an outer surface of said glass tube.

18. A fluorescent lamp arrangement according to claim 9, in which said light-shading patterned layer includes round patterns.

19. A fluorescent lamp arrangement according to claim 9, wherein said display panel comprises a liquid crystal display (LCD) panel.

20. A fluorescent lamp arrangement according to claim 9, further comprising a diffusion means parallelly disposed on the inner surface of said display panel for dispersing and radiating the light from said lamp so as to result in an increase in the visual angle.

21. A fluorescent lamp arrangement according to claim 10, wherein said light-shading patterned layer includes one of opaque circles, opaque triangular areas, opaque square areas or opaque hexagonal areas.

22. A fluorescent lamp arrangement according to claim 9, further comprising a reflector with a reflecting surface facing the display panel and being disposed so as to reflect incident light from said fluorescent lamp to said display panel.

23. In a fluorescent lamp arrangement for uniformly illuminating a display panel having two parallel side edges and which has an outer surface and an inner surface, including a fluorescent lamp having a glass tube having a center axis and two opposite ends and provided with electrodes at said opposite ends, a fluorescent layer formed over an inner surface of said glass tube, and wherein said glass tube being sealed and having therein mercury and a rare gas, the improvement comprising:

a light-shading patterned layer disposed on a circumferential part of the outer surface of said glass tube, said patterned layer including a plurality of rows of predetermined pattern shapes along a length of the surface of said glass tube in a direction substantially along said center axis wherein rows of the pattern shapes located on the circumferential surface of said glass tube nearest the inner surface of said display panel having the largest dimensioned pattern shapes of said patterned layered so as to make luminance substantially uniform on said display panel when said fluorescent lamp is mounted in a predetermined positional relationship with the display panel such that said display panel is parallelly disposed to the center axis of said glass tube and illuminated through said light-shading patterned layer by said fluorescent lamp, said circumferential part facing the display panel when said fluorescent lamp is mounted and wherein said part is defined as that part of said surface between two lines on said surface defined by a radial intersection of imaginary planes therethrough, each plane including said center axis and a respective one of said side edges.

24. A fluorescent lamp arrangement according to claim 23, wherein said plurality of parallel rows of predetermined pattern shapes being disposed on said glass surface such that the relative dimensional areas of the respective pattern shapes in successive rows and in a direction away from the location nearest the inner surface of the display panel proportionately decreasing.

25. A fluorescent lamp arrangement according to claim 24, wherein said light-shading patterned layer includes one of opaque circles, opaque triangular areas, opaque square areas or opaque hexagonal areas.

26. A fluorescent lamp arrangement according to claim 23, further comprising a reflector with a reflecting surface facing the display panel and being disposed so as to reflect incident light from said fluorescent lamp to said display panel.

* * * * *